Figure 1:
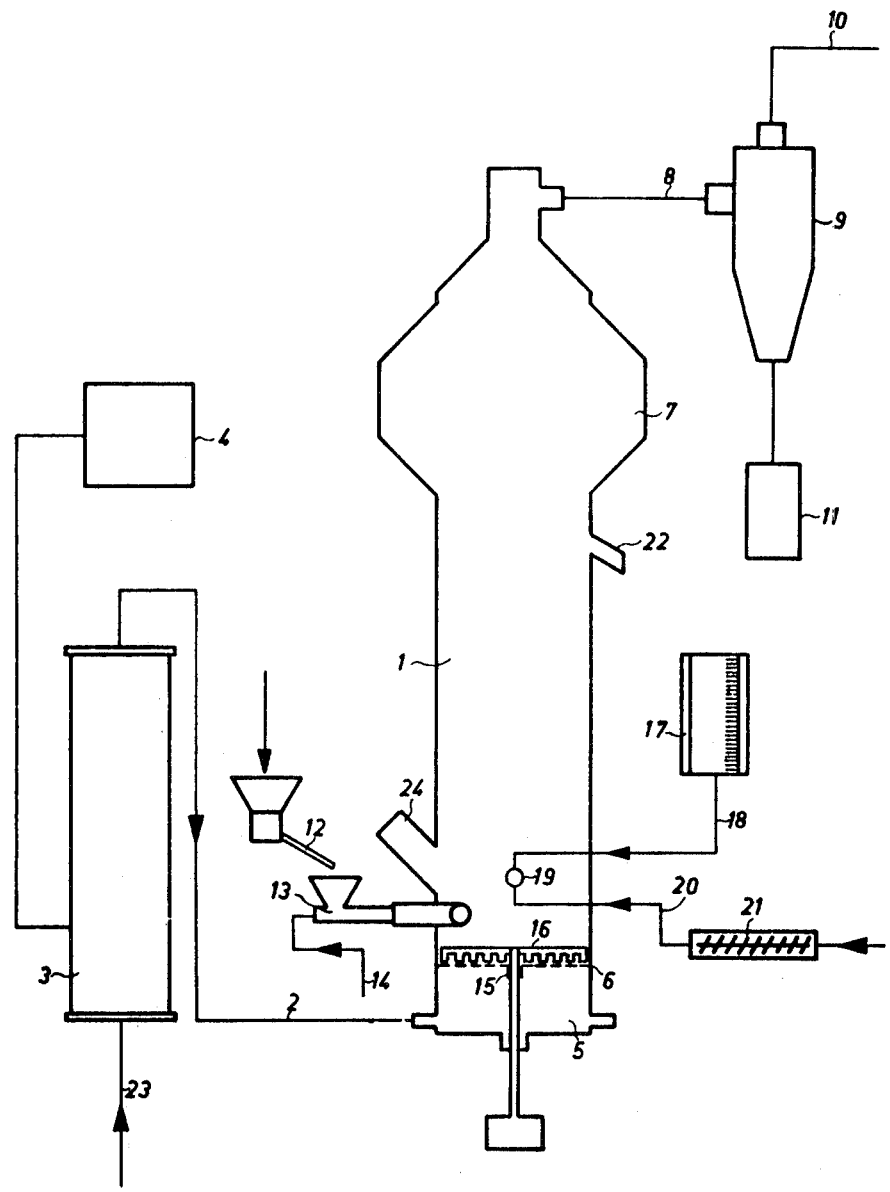

United States Patent [19]

Brichard

[11] 4,005,136

[45] Jan. 25, 1977

[54] GRANULES OF SALTS OF POLY-α-HYDROXYACRYLIC ACIDS AND A PROCESS FOR THEIR MANUFACTURE

[75] Inventor: Jean Brichard, Vilvoorde, Belgium

[73] Assignee: Solvay & Cie, Brussels, Belgium

[22] Filed: June 10, 1975

[21] Appl. No.: 585,587

[30] Foreign Application Priority Data

July 11, 1974  France .............................. 74-24603

[52] U.S. Cl. ............................................ 260/535 P
[51] Int. Cl.² ........................................ C07C 59/17
[58] Field of Search ................................ 260/535 P

[56] References Cited

UNITED STATES PATENTS 3,706,672  12/1972  Martin ............................ 260/535 R
3,758,419   9/1973  Hayden ........................... 260/535 R

*Primary Examiner*—Paul J. Killos
*Attorney, Agent, or Firm*—Spencer & Kaye

[57] ABSTRACT

Granules of ammonium or alkali metal poly-α-hydroxyacrylates having an apparent specific gravity of between 0.35 and 0.55 kg/dm³ and an ability to flow, expressed by the time taken for a weight of 250 g to flow through the 16 mm diameter orifice of an analysis funnel with a short stem, not exceeding 10 seconds are disclosed. The granules are prepared by agglomerating solid particles of small dimensions by spraying them in a fluid bed with a solution of poly-α-hydroxyacrylate.

10 Claims, 2 Drawing Figures

GRANULES OF SALTS OF POLY-α-HYDROXYACRYLIC ACIDS AND A PROCESS FOR THEIR MANUFACTURE

The present invention relates to an entirely new form of alkali metal or ammonium salts of poly-α-hydroxyacrylic acid or its alkylated derivatives, which can be used as "builders" in detergent compositions; this new form possesses numerous advantages, and especially an excellent ability to flow, a good wear index, and an adequate apparent density compatible with that of the other constituents of the detergent powders and the dimensions of the particles of which can vary within rather wide limits. The invention also relates to a new process which makes it possible to prepare these products.

The product obtained by precipitating, by means of methanol, alkali metal or ammonium salts of poly-α-hydroxyacrylic acids from their aqueous solutions in accordance with the process described in Belgian Pat. No. 786,464 of July 19, 1972 in the name of Solvay & Cie, is in the form of a very fine powder which possesses a very poor ability to flow. During storage, caking phenomena are observed and it is difficult to incorporate the product into washing powders.

Numerous processes for the manufacture of granules of organic or inorganic compounds have been mentioned in the literature. The base material employed is usually a solution of the product to be granulated. Thus, it has been proposed to manufacture granules of organic or inorganic substances by joining together unit crystals of these substances by dispersing them in the form of a suspension in a supersaturated solution of the same substance (French Pat. No. 1,187,352 of Nov. 29th, 1957 in the name of the SOCIETE D'ELECTRO-CHIMIE, D'ELECTRO-METALLURGIE ET DES ACIERIES ELECTRIQUES D'UGINE). This process, however, necessitates subsequent drying of the granules obtained and a step involving the reconcentration of the depleted solution, and this makes it particularly expensive.

When the product to be granulated is already available in solid form but is in the form of particles of inadequate dimensions, it is undoubtedly not very economical to dissolve it prior to preparing the granules. Moreover, it is impossible to granulate poly-α-hydroxyacrylates directly, starting from their aqueous solutions. Thus, by means of atomisation, a very fine powder is obtained which possesses a poor ability to flow and is difficult to dry. Likewise, when conventional processes involving a fluid bed are used, particles are also obtained which are difficult to dry and are so fine that they are entrained by the air used in the fluidisation process. This is due to the fact that solutions of poly-α-hydroxyacrylates are very viscous and that, consequently, they do not coat the seeds introduced into the fluid bed well, and the result of this is that practically all of the product dries as in a process involving atomisation. Moreover, since the poly-α-hydroxyacrylates do not crystallise, diffusion of the solvent through the granule takes place only slowly and it is difficult to dry the particles.

The present invention is directed to preparing, in a single operation, a dehydrated solid product which is in the form of granules of predetermined dimensions, starting from a finer product originating from the synthesis of alkali metal or ammonium salts of poly-α-hydroxyacrylic acids, without it being necessary to dissolve all the product.

The new products which form the subject of the present invention are characterised by their apparent specific gravity and by their ability to flow.

The granules of alkali metal or ammonium salts of substituted or unsubstituted poly-α-hydroxyacrylic acids, which form the subject of the present invention, have an apparent specific gravity under free flow of between 0.35 and 0.55 kg/dm$^3$ and preferably between 0.40 and 0.50 kg/dm$^3$, and an ability to flow, expressed by the time taken for a weight of 250 g to flow through the 16 mm diameter orifice of an analysis funnel with a short stem, not exceeding 10 seconds.

The dimensions of the granules can vary within rather wide limits. However, granules will preferably be prepared which have a particle size close to that of the other components of the detergent powders. In general, a particle size such that at least approximately 80% of the granules have a diameter of between 0.1 and 1.5 mm is very particularly suitable. The average diameter of the particles will advantageously be between 0.3 and 0.5 mm. However, by changing the conditions of the method for preparing the granules, it is possible to prepare larger or smaller granules whilst retaining the characteristics of the product from the point of view of ability to flow and apparent specific gravity.

The product which forms the subject of the present invention proves particularly valuable relative to the products prepared previously, because it possesses a better wear index, a better ability to flow and a very low fines content which makes it possible to avoid caking and attrition.

The salts of poly-α-hydroxyacrylic acids which form the subject of the present invention have the formula

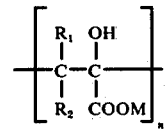

wherein $R_1$ and $R_2$ represent a hydrogen or an alkyl group containing 1 to 3 carbon atoms, M represents an alkali metal or an ammonium group, and n has a value at least equal to 10. $R_1$ and $R_2$ can be identical or different; in general, $R_1$ represents hydrogen and $R_2$ either hydrogen or a methyl group. M will most frequently represent sodium, potassium or an ammonium group. The degree of polymerisation of the poly-α-hydroxyacrylates which form the subject of the present invention is in general between 10 and a higher value determined by the limit compatible with the solubility of the compound in water; it is most frequently between 50 and 10,000.

The apparent specific gravity under free flow, which is referred to in the present invention, is determined by a process analogous to that described in A.S.T.M. Standards D 392-38 and B 212-48, respectively proposed for measuring the apparent specific gravity of moulding powders and metal powders. The equipment used is, however, slightly different. It comprises a hopper in the shape of a truncated cone, the large base of which has a diameter of 53 mm, and the small base of which, equipped with a shut-off which can be opened completely, has a diameter of 21 mm, the height between the bases being 58 mm and the useful volume approximately 60 cm$^3$.

The cylindrical cell, of volume 50 cm$^3$, has an internal diameter of 37 mm and a height of approximately 46 mm. The base of the hopper is placed 65 mm above the bottom of the cell. The procedure is identical to that described in the ASTM standards. The shut-off of the hopper is closed and the latter is filled with the product to be examined and smoothed off to the level of the upper edge of the hopper by means of a straight-edge. The cell is positioned in line with the axis of the hopper and the shut-off is opened. After the material has flowed out, it is smoothed off to the upper level of the cell. The apparent specific gravity under free flow is equal to the ratio of the weight of material in the cell, expressed in kg, to the volume of the cell, expressed in dm$^3$.

The ability of the product to flow is characterised by the time taken for a particular amount of product to flow through the orifice of the stem of a calibrated funnel. The process is substantially analogous to that described in ASTM Standard D 392-38.

The apparatus consists of a funnel with a polished stainless steel valve, the cone angle of which is 60°, the internal diameter of which is 180 mm, and the length of the stem of which is 165 mm. The internal diameter of the stem is 16 mm. The test consists of introducing 250 g of product into the funnel and of measuring the time taken to flow out after opening the valve.

The granules of alkali metal or ammonium salts of poly-$\alpha$-hydroxyacrylic acids, possessing a good ability to flow and an apparent specific gravity of between 0.35 and 0.55 kg/dm$^3$, which form the subject of the present invention, can be prepared from the finer product originating from their synthesis.

A further subject of the present invention relates to a process for the manufacture of granules of alkali metal or ammonium salts of substituted or unsubstituted poly-$\alpha$-hydroxyacrylic acids, characterised in that solid particles of small dimensions of these substances are agglomerated by spraying them in a fluid bed with a solution of this same substance, this solution acting as a binder between the said solid particles, at a temperature such that rapid evaporation of the solvent is made possible.

The process developed in accordance with the present invention proves particularly valuable because it makes it possible to obtain, in one step, dry granules possessing an adequate apparent specific gravity and a good ability to flow.

The temperature of the fluid bed will advantageously be between 40° and 90° C, and preferably between 50° and 80° C. Lower temperatures give a product which is less dry. Higher temperatures can cause yellowing of the granules. The temperature of the air or other carrier gas introduced at the bottom of the fluidised bed, for example through a gauze or a distribution plate, is preferably below approximately 180° C, and preferably between 150° and 180° C.

The process according to the invention can be carried out by introducing, into the fluidised bed, 80 to 98% by weight, and preferably 85 to 95% of the product to be granulated, in solid form, the remainder, corresponding to 20 to 2 and preferably 15 to 5%, of the product to be granulated being introduced in the form of a solution. It is of little value economically to introduce larger amounts of product in the form of a solution into the fluid bed, because the amount of solvent to be evaporated is then too large. On the other hand, when too little solution is introduced, a decrease in the resistance to attrition of the granules formed is observed. Advantageously, solutions containing quite a high concentration of poly-$\alpha$-hydroxyacrylates will be used, so as not to have to evaporate too much solvent in the fluid bed, whilst taking care, however, that the solution is sufficiently fluid at the use temperature to be able to be sprayed easily into the fluid bed. Concentrations of 1 to 20 and preferably 5 to 10% by weight of poly-$\alpha$-hydroxyacrylates in the solution will advantageously be used. The solvent usually employed will be water; other solvents can, however, also be suitable.

The solution of poly-$\alpha$-hydroxyacrylates is prepared by dissolving, in the solvent, fine particles entrained from the fluid bed, material not used in the production process or optionally product originating from the manufacturing process. It is of course possible to use mixtures of product originating from these various sources. Advantageously, the fine particles entrained from the fluid bed will be used.

The solution is advantageously raised to a temperature close to that of the fluid bed before being introduced into the latter, so as to reduce its viscosity. This solution can be introduced either into a zone situated above the actual bed, or into the fluidised bed itself, in any manner which is in itself known. It is possible, for example, to use pneumatic injection devices such as spray nozzles for this purpose.

The solid product can be introduced in any known manner, for example by means of a Venturi system. The solid product introduced into the fluid bed originates from the manufacturing process as well as possibly from fines entrained by the gas used in the fluidisation process or from the material not used in the production process after grinding the granules which are too large. The average diameter of the particles of the solid charge is generally less than 0.2 mm, and most frequently between 0.01 and 0.1 mm. Of course, these values are given only by way of example and it is possible to use particles of smaller dimensions.

The process according to the invention can be carried out continuously or discontinuously. The drier possessing a fluidised bed can have a cylindrical, cylindrical-conical or parallelepiped shape, or any other shape which enables the process to be applied.

The granules can be removed by means of any known device, for example through the bottom of the drier with elutriation, or by overflowing through a side tube, this tube then determining the height of the fluidised bed.

The drier possessing a fluid bed can advantageously be equipped with a mechanical device for destroying agglomerates which are too large, for example a grinder, an agitator or a scraper positioned within the fluidised bed. These devices also make it possible to prevent the bed from becoming compressed and setting solid. However, when fluid beds of large dimensions are used, it is not generally necessary to employ such devices for breaking up agglomerates.

The gases coming from the fluid bed pass through a fines separator such as, for example, a cyclone. The gases removed can be discharged to the atmosphere or can optionally be recycled to the fluid bed, partially or completely, after removing the water vapour which they contain by drying or condensation The dimensions of the particles are controlled by the pressure of the gas in the injection device which makes it possible to introduce the solution into the fluid bed, the size of the particles being inversely proportional to the pressure. If the equipment used comprises a grinder in the fluid bed, the size of the grains will of course be inversely proportional to the extent to which the grinder is used.

The process according to the invention can be carried out in an apparatus such as, for example, that shown in the attached FIG. 1 which represents one method of carrying out the process according to the invention.

FIG. 1 represents a bed of particles 1 fluidised by means of a gas such as air which enters the system via the line 2 after having been preheated in a preheating device 3 supplied with air via the line 23 and the temperature of which is controlled by means of a regulating device 4. The hot air passes into the wind box 5, passes through the grid 6 and enters the fluid bed 1 surmounted by a zone 7 which makes it possible to send a part of the fines back to the fluid bed. The grid 6 is pierced at the centre with a hole 15 which permits the axle of a scraper with flexible blades 16 to pass through. A tube 24 makes it possible to introduce a grinder into the bottom of the bed.

The gases coming from the fluid bed pass via the line 8 into a fines collector or cyclone 9 and leave the apparatus via the ventilating pipe 10. The fines are recovered at 11.

The solid product originating from the synthesis and optionally a part of the fines recovered at 11 are conveyed simultaneously, via a vibrating chute 12, into a fluid bed by means of a Venturi 13 supplied with compressed air via the line 14. The solution of product used as binder leaves the thermostatically controlled storage reservoir 17, kept at the desired temperature, via the line 18, and is sprayed into the fluid bed by means of a spray nozzle 19, supplied with compressed air via the line 20, this air being heated in a heating device 21.

The granulated product is collected by overflowing via the line 22.

Figure 2:
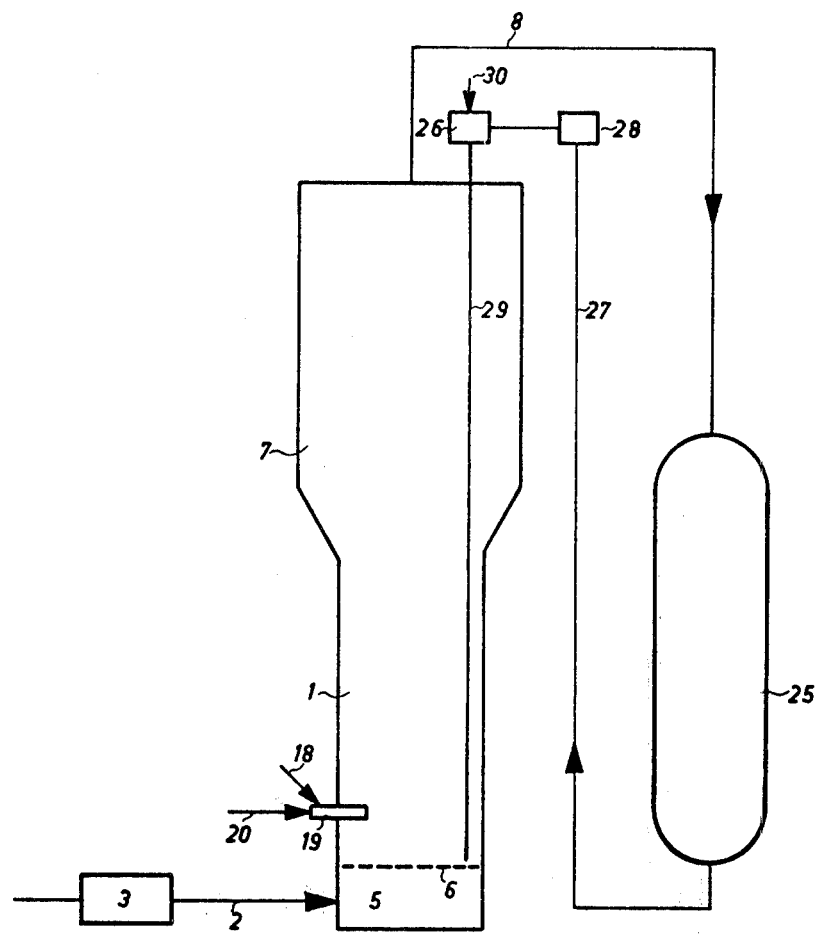

FIG. 2 represents an apparatus which makes it possible to carry out the process according to the invention discontinuously. A bed of particles 1 is fluidised by means of a gas such as air which enters the system via the line 2 after having been preheated in 3. The hot air passes into the wind box 5, passes through the grid 6 and enters the fluid bed 1 surmounted by a zone 7 which makes it possible to send a part of the fines back to the fluid bed.

The gases coming from the fluid bed pass via the line 8 into a gauze filtering sleeve 25. The fines collected in the sleeve are conveyed via the line 27 into a Venturi 26 supplied with compressed air via the line 30. They are then recycled to the fluid bed via a vertical tube 29 which passes through the lid of the fluid bed and is immersed in the fluidised layer. A pressure lock 28 is provided in the circuit.

The solution used as binder is conveyed via the line 18 into a spraying device 19 supplied with compressed air via the line 20.

Embodiments of the process are given below, in order to illustrate the invention without in any way limiting the scope thereof. The apparatuses and the procedures described below can be replaced by equivalent means well known to those skilled in the art.

EXAMPLE 1

The experiments mentioned below were carried out continuously in an apparatus of the same type as that represented in FIG. 1. The drier of cylindrical cross-section used comprises two lengths of different diameters. The lower length 1 has a diameter of 152 mm and a height above the air distribution grid of 915 mm, whilst the upper length 7 has a diameter of 254 mm and a height of 420 mm. The gas distribution plate 6 consists of a sheet of stainless steel perforated with 0.5 mm diameter holes. This sheet is pierced at the centre with a 20 mm diameter hole in order to enable a scraper with flexible blades to pass through. The scraper rotates at a speed of 70 revolutions/minute. A grinder which operates for 2 seconds approximately every 100 seconds is introduced via the tube 24. The granules are removed by overflowing through a tube situated 760 mm from the bottom of the fluid bed.

The bed of particles is fluidised by introducing, through the gas distribution plate, a stream of 17 N m³/hour of air heated to 165° – 170° C. Initially, the drier contains 3.640 kg of screened sodium poly-α-hydroxyacrylate. The average diameter of this charge was 0.090 mm.

The product possesses a very poor ability to flow and it is not possible to measure the apparent specific gravity thereof under free flow because caking is observed.

The drier is supplied continuously with an aqueous solution of sodium poly-α-hydroxyacrylate, by means of a spray nozzle immersed in the fluid bed.

The stable working conditions as well as the characteristics of the product obtained are given in Table 1 below.

The resistance to attrition was measured in accordance with Standard Specification ISO/TC 47/WG 11 (Secretariat – 86) 167 of the British Standard Institution.

Table 1

|  |  | Experiment 1 | Experiment 2 |
| --- | --- | --- | --- |
| Air used in the fluidisation process |  |  |  |
| Temperature | ° C | 165 – 170 | 165 – 170 |
| Flow rate | N m³/hour | 17 | 17 |
| Temperature of the fluidised layer | ° C | 50 – 55 | 50 – 55 |
| Supply to the spray nozzle Air |  |  |  |
| Flow rate | N m³/hour | 3.5 | 3.5 |
| Temperature | ° C | 76 – 80 | 76 – 80 |
| Pressure | kg e/cm² | 2 | 2 |
| Solution of sodium poly-α-hydroxyacrylate |  |  |  |
| Concentration | g/kg | 70 | 100 |
| Temperature | ° C | 70 | 70 |
| Flow rate | kg/hour | 0.84 | 1.14 |
| Supply of solid product |  |  |  |

Table 1-continued

|  | | Experiment 1 | Experiment 2 |
|---|---|---|---|
| Average flow rate of poly-α-hydroxyacrylate resulting from the synthesis process | kg/hour | 0.81 | 0.65 |
| Average flow rate of recycled fines | kg/hour | 1.87 | 1.35 |
| Pressure of air at the Venturi | kg e/cm$^2$ | 0.6 | 0.6 |
| Flow rate of air at the Venturi | N m$^3$/hour | 2.5 | 2.5 |
| Product obtained | | | |
| Production | kg/hour | 0.87 | 0.77 |
| Apparent specific gravity under free flow | kg/dm$^3$ | 0.41 | 0.42 to 0.48 |
| Average diameter | mm | 0.405 | 0.425 |
| Attrition (ISO standard specification test) | % | 22 | 14 |
| Ability to flow | seconds | 6 | 4 − 5 |

The amount of material, in terms of weight, which does not pass through a 1.4 mm mesh sieve, is less than 1%.

The particle size of the product obtained was compared with that of the starting product. Table 2 below gives the percentages of the samples which pass through sieves with different mesh sizes.

Table 2

| | Experiment 1 | | Experiment 2 | |
|---|---|---|---|---|
| Mesh size of the sieves mm | Product resulting from the synthesis process | Granulated product | Product resulting from the synthesis process | Granulated product |
| | % by weight | | | |
| 1.000 | | 97.9 | | 97.4 |
| 0.710 | | 83.8 | | 82.2 |
| 0.500 | | 60.9 | | 59.3 |
| 0.350 | 85.5 | 40.4 | 100.0 | 38.0 |
| 0.250 | 81.6 | 22.0 | 97.8 | 18.0 |
| 0.125 | 65.0 | 4.5 | 95.3 | 3.0 |
| 0.088 | 46.5 | | 93.3 | |
| 0.063 | 28.3 | | 72.1 | |
| 0.045 | 13.3 | | 50.4 | |
| 0.020 | | | 5.7 | |
| Average diameter mm | 0.090 | 0.405 | 0.076 | 0.425 |

The results given above show that it is possible, by using the process according to the invention, to obtain granules possessing an apparent specific gravity and a particle size similar to those of the other components of washing powders which are usually 0.35 to 0.50 kg/dm$^3$ and 0.3 to 0.5 mm in diameter respectively.

This process did not lead to the bed becoming compressed. A very homogeneous product is obtained which always possesses the same physical characteristics. It makes it possible, in a single operation, to obtain a product containing less than 0.1% of water under the chosen working conditions.

It is obvious that variants can be considered, without going outside the patent. It is possible to use a drier in which the granules issue at the bottom of the bed, it is possible to introduce the solution above the fluidised bed, and it is possible to provide an agitator of another type or even to dispense with it.

EXAMPLE 2

This example illustrates another variant of the process for the preparation of granules of poly-α-hydroxyacrylates.

The experiment was carried out discontinuously in a drier with a fluid bed, of cylindrical cross-section, comprising two lengths of different diameters, as described in FIG. 2. The lower length has a diameter of 300 mm and a total height of 1,010 mm. It is surmounted by a length, the diameter of which is 500 mm and the height of which is 1,000 mm. The gas distribution plate, situated 150 mm from the bottom of the lower length, is pierced with 600 holes of diameter 2 mm, oriented laterally.

The bed of particles is fluidised by introducing, through the gas distribution plate, a stream of 50 N m$^3$/hour of air heated to 170° C. The temperature of the fluid bed is 60° C.

Initially, the drier contains 15 kg of particles of very small dimensions of sodium poly-α-hydroxyacrylate resulting from the synthesis process.

The drier is supplied for 4 hours by a spray nozzle situated within the fluid bed, by means of which 2 kg/hour of a 5% strength by weight aqueous solution of sodium poly-α-hydroxyacrylate at 25° C are sprayed with 6 N m$^3$/hour of air at 100° C and at an effective pressure of 3.5 kg/cm$^2$.

The fines entrained with the air used to effect fluidisation are collected in a filtering sleeve connected to the outlet for the gases used in the fluidisation process and are recycled at the rate of 5.7 kg/hour of fines to the fluid bed via a vertical tube which is immersed in the fluidised layer and descends to 50 mm above the gas distribution grid.

The ability of the product to flow is excellent. The average diameter of the particles obtained is 0.3 mm.

I claim:

1. Granules of alkali metal or ammonium salts of substituted or unsubstituted poly-α-hydroxyacrylic acids, wherein their apparent specific gravity under free flow is between 0.35 and 0.55 kg/dm$^3$ and their ability to flow, expressed by the time taken for a weight of 250 g to flow through a 16 mm diameter orifice of an analysis funnel with a short stem, does not exceed 10 seconds.

2. Granules according to claim 1, wherein they consist of particles, at least 80% of which have a diameter of between 1.5 and 0.1 mm.

3. Process for the manufacture of granules of alkali metal or ammonium salts of substituted or unsubstituted poly-α-hydroxyacrylic acids, comprising: agglomerating solid particles of small dimensions of these substances by spraying them in a fluid bed with a solution of this same substance, this solution acting as a binder between the said solid particles, at a temperature such that rapid evaporation of the solvent occurs.

4. Process according to claim 3, wherein the temperature of the fluid bed is between 40 and 90° C.

5. Process according to claim 3, wherein the temperature of the fluid bed is between 50° and 80° C.

6. Process according to claim 3, wherein the amount of alkali metal or ammonium salts of poly-α-hydroxyacrylic acids introduced in the form of solid particles is between 80 and 98% of the total weight of the said salts introduced into the fluid bed.

7. Process according to claim 6, wherein the amount of alkali metal or ammonium salts of poly-α-hydroxyacrylic acids introduced in the form of solid particles is between 85 and 95% of the total weight of the said salts introduced into the fluid bed.

8. Process according to claim 3, wherein the solution of alkali metal or ammonium salts of poly-α-hydroxyacrylic acids is an aqueous solution.

9. Process according to claim 8, wherein the aqueous solution contains 1 to 20% by weight of alkali metal or ammonium salts of poly-α-hydroxyacrylic acids.

10. Process according to claim 3, wherein fines are collected at the outlet of the fluid bed, and these collected fines are recycled to the fluid bed.

* * * * *